United States Patent
Aitken

(10) Patent No.: US 7,539,777 B1
(45) Date of Patent: May 26, 2009

(54) METHOD AND SYSTEM FOR NETWORK TIME PROTOCOL FORWARDING

(75) Inventor: Paul J. Aitken, Peeblesshire (GB)

(73) Assignee: Cisco Technology, Inc., San Jose, CA (US)

( * ) Notice: Subject to any disclaimer, the term of this patent is extended or adjusted under 35 U.S.C. 154(b) by 608 days.

(21) Appl. No.: 10/280,288

(22) Filed: Oct. 25, 2002

(51) Int. Cl.
G06F 15/16 (2006.01)
H04J 3/16 (2006.01)

(52) U.S. Cl. .................. 709/248; 709/203; 370/466

(58) Field of Classification Search .......... 709/203, 709/248; 370/466
See application file for complete search history.

(56) References Cited

U.S. PATENT DOCUMENTS

| | | | |
|---|---|---|---|
| 6,351,821 B1 * | 2/2002 | Voth | 713/600 |
| 6,674,754 B1 * | 1/2004 | Ofek | 370/389 |
| 6,690,669 B1 * | 2/2004 | Tsuchiya et al. | 370/392 |
| 6,725,278 B1 * | 4/2004 | Gonzalez | 709/248 |
| 6,769,000 B1 * | 7/2004 | Akhtar et al. | 707/103 R |
| 6,885,664 B2 * | 4/2005 | Ofek et al. | 370/372 |
| 7,006,526 B1 * | 2/2006 | Biederman | 370/466 |
| 2002/0078243 A1 * | 6/2002 | Rich et al. | 709/248 |
| 2002/0136335 A1 * | 9/2002 | Liou et al. | 375/354 |
| 2003/0200338 A1 * | 10/2003 | Fulghum et al. | 709/248 |
| 2003/0219023 A1 * | 11/2003 | Miyata et al. | 370/395.53 |
| 2004/0073718 A1 * | 4/2004 | Johannessen et al. | 709/400 |

* cited by examiner

*Primary Examiner*—Ario Etienne
*Assistant Examiner*—El Hadji M Sall
(74) *Attorney, Agent, or Firm*—Campbell Stephenson LLP

(57) ABSTRACT

A method and system for network time protocol forwarding is disclosed. The disclosed method includes in one embodiment receiving time data from a server utilizing a first protocol and transmitting the time data to a client utilizing a second protocol. In another embodiment, the described method further includes receiving the time data from a network time protocol time server and transmitting the time data to a network time protocol time client. In yet another embodiment, the described method further includes receiving the time data from the network time protocol time server utilizing a first network-layer protocol and transmitting the time data to the network time protocol time client utilizing a second network-layer protocol.

43 Claims, 8 Drawing Sheets

METHOD AND SYSTEM FOR NETWORK TIME PROTOCOL FORWARDING

BACKGROUND

1. Technical Field

The present invention relates to communication networks generally. More specifically, the present invention relates to a method and system for network time protocol forwarding.

2. Description of Related Art

In a communications network, the synchronization of time between network elements may be important in a variety of situations (e.g., stock market sale and buy orders and confirmation timestamps or other time-critical business transactions, network fault isolation, reporting and restoration, network monitoring, measurement and control, distributed multimedia stream synchronization, remote procedure call at-most-once transactions, research experiment setup, measurement and control, and cryptographic key management and lifetime control). In such situations, synchronization is typically provided by synchronizing a local clock of each relevant network element within the communications network to a reference time (e.g., Coordinated Universal Time or "UTC") using one of several known techniques, protocols, and/or systems such as the network time protocol (NTP) or simple network time protocol (SNTP).

FIG. 1 illustrates a network time protocol framework according to the prior art. In the illustrated framework, a synchronization network is illustrated including one or more primary NTP time servers 100, each including a reference time source (not illustrated) such as a calibrated atomic clock or radio clock synchronized with a reference time (e.g., UTC), and a synchronization sub-network 108 including a larger number of secondary NTP time servers and/or secondary NTP time clients which obtain time data either from primary NTP time server 100 or other secondary NTP time servers. Synchronization between a reference time source and a given reference time may be obtained via any of a number of mechanisms including modem 102, satellite 104 (e.g., Global Positioning Service, Geostationary Operational Environment Satellite, Long Range Navigation "LORAN", etc), and/or radio link 106 as shown or other conventional data communication mechanisms such as local or wide-area communications network(s) (not illustrated).

In the illustrated framework, time clients and time servers are categorized by "stratum", the effective number of NTP "hops" between a time client or server and an authoritative reference time source. NTP time servers (e.g., primary NTP time servers 100) which are directly coupled to reference time sources are described as being stratum 1 network elements, NTP time clients 110a and NTP time servers 112a which obtain time data from stratum 1 network elements are described as being stratum 2 network elements, and so on from stratum 1 to stratum n as shown. In addition to this client/server mode of operation, time data may be transferred utilizing a symmetric mode, for example between same-stratum-level peer NTP time client(s) and/or server(s), to cross-check local clocks and mitigate errors due to equipment or propagation failures. Time data is transferred between NTP time clients and NTP time servers utilizing NTP messages which are exchanged by instantiations of the protocol machine known as "associations" within each client or server.

FIG. 2 illustrates an NTP time server synchronization process according to the prior art. In the illustrated process, time data is first received by an NTP time server either directly from a reference time source or from another NTP time server (e.g., via multicast, unicast, or anycast transmission of an NTP message) utilizing an IP version 6 (IPv6) transport (process block 200). Thereafter, a determination is made whether or not the received time data is to be transmitted via multicast or "broadcast" transmission (process block 202). If multicast transmission is to be used, a determination is then made whether a peer timer has expired (process block 204) signaling the NTP time server that the next multicast time data transmission should be sent. Once a determination is made that the peer timer has expired, a multicast NTP message is generated utilizing the previously received time data (process block 206) and transmitted to one or more NTP time clients utilizing an IPv6 transport (process block 208).

If the received time data is not to be transmitted by the NTP time server utilizing multicast transmission, a determination is made whether a time data request NTP message has been received (e.g., by unicast or anycast transmission) from an NTP time client (process block 210). Once a time data request has been received, a time data reply NTP message is generated utilizing the previously received time data (process block 212) and transmitted to the requesting NTP time client utilizing an IPv6 transport (process block 214). In another prior art NTP time server synchronization process (not illustrated), the process depicted by and described with respect to FIG. 2 is duplicated with the exception that time data is received by an NTP time server (see process block 200) and transmitted to one or more time clients (e.g., via multicast, unicast, or anycast transmission) (see process blocks 202 and 208) utilizing IP version 4 (IPv4).

NTP time clients utilize time data within transferred NTP messages to determine attributes such as clock offset, roundtrip delay, and dispersion for one or more associated NTP time servers which are used to select the most accurate NTP time server available for use in adjusting the NTP time client's local clock to bring it into correspondence with the reference clock. NTP messages are typically encapsulated within user datagram protocol (UDP) datagrams which are in turn encapsulated within Internet Protocol (IP) packets. The transfer of NTP messages and time data in conventional communications networks is therefore dependent on the network-layer protocol-implementation of each relevant NTP time server and NTP time client.

Consequently, while IPv4 only NTP time servers, which constitute the vast majority of available NTP time servers on the Internet, can provide time data to other IPv4 NTP time servers and NTP time clients, they cannot currently provide time data to NTP time clients and NTP time servers implementing other network-layer protocols such as IPv6. Consequently, IPv6 only NTP time clients and NTP time servers must currently obtain time data either from one or more of an extremely small number of publicly available IPv6 only NTP time servers as illustrated in FIG. 2 or by providing their own IPv6 primary NTP time server and associated reference time source. Drawbacks associated with these approaches include the reduced reliability and availability of existing IPv6 only NTP time servers as compared to existing IPv4 only NTP time servers due to their small number and the resulting potential for overburdening, the significant cost associated with obtaining an accurate reference time source, and the waste of resources associated with providing separate sets of IPv4 and IPv6 NTP time servers.

SUMMARY

A method and system for network time protocol forwarding is disclosed. The disclosed method includes in one embodiment receiving time data from a server utilizing a first protocol and transmitting the time data to a client utilizing a second protocol.

In another embodiment of the present invention, the described method further includes receiving time data from a network time protocol time server and transmitting time data to a network time protocol time client.

In yet another embodiment of the present invention, the described method further includes receiving time data from a network time protocol time server utilizing a first network-layer protocol and transmitting time data to a network time protocol time client utilizing a second network-layer protocol.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

Embodiments of the present invention are illustrated by way of example and not limitation in the figures of the accompanying drawings in which similar references are utilized to indicate similar elements and in which.

DETAILED DESCRIPTION

Embodiments of the present invention may include features or processes embodied within machine-executable instructions provided by a machine-accessible medium. Such a medium may include any mechanism which provides (i.e., stores and/or transmits) data in a form accessible by a machine (e.g., a data processing system, host, router, or other network element, etc.). For example, a machine-accessible medium may include volatile and/or non-volatile media such as read only memory (ROM), random access memory (RAM), magnetic disk storage media, optical storage media, flash memory devices; etc., as well as electrical, optical, acoustical or other forms of propagated signals (e.g., carrier waves, infrared signals, digital signals, etc.).

Such instructions can be used to cause a general or special purpose processor, programmed with the instructions, to perform processes of the present invention. Alternatively, processes of the present invention may be performed by specific hardware components containing hard-wired logic to perform operations or by any combination of programmed data processing components and hardware components. Thus, embodiments of the present invention may include software, data processing hardware, data processing system-implemented methods, and various processing operations, further described herein.

Figure 1:
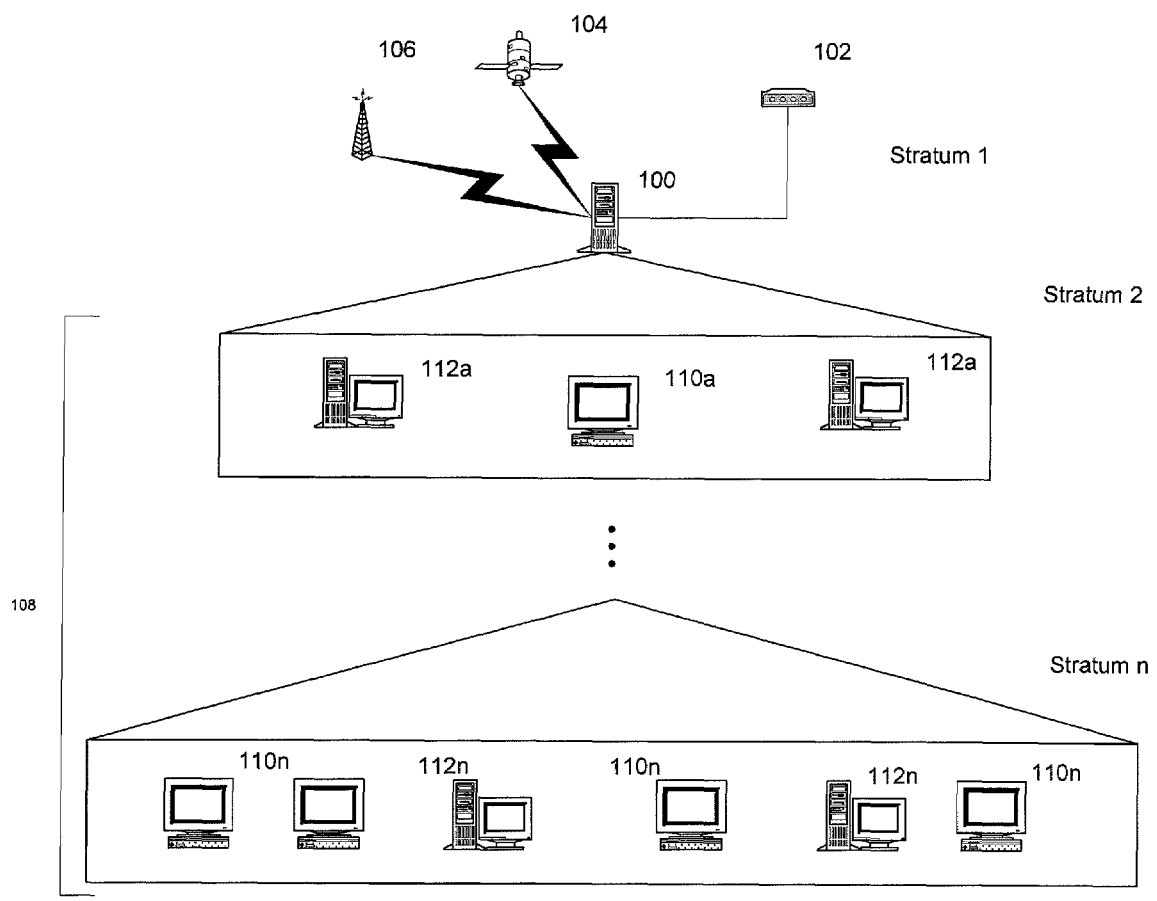
FIG. 1 illustrates a network time protocol framework according to the prior art.
Figure 2:
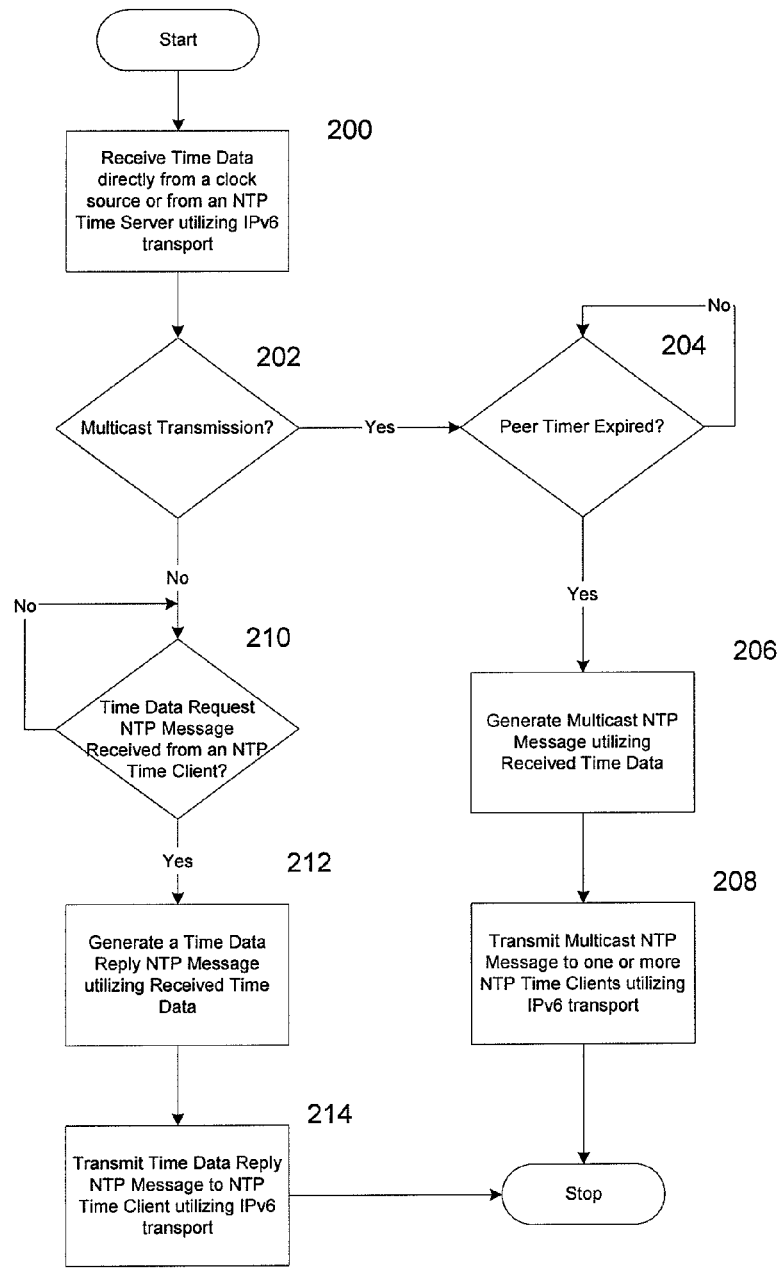
FIG. 2 illustrates an NTP time server synchronization process according to the prior art.
Figure 3:
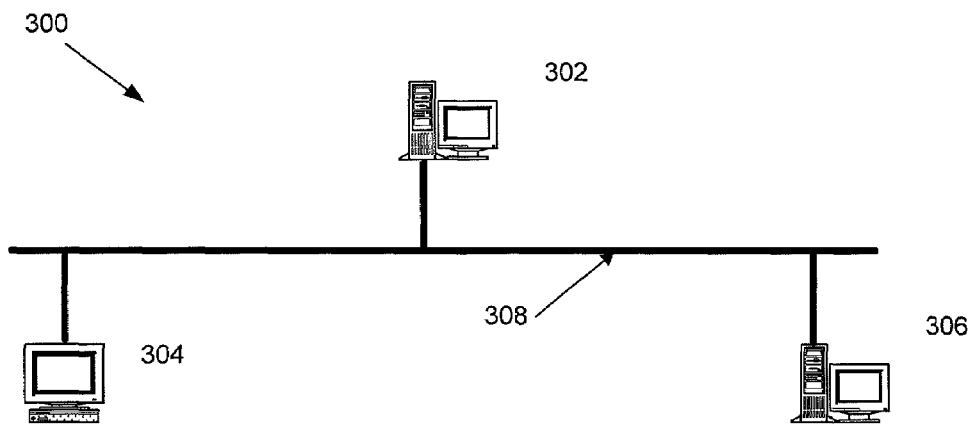
FIG. 3 illustrates a communications network useable with one or more embodiments of the present invention.

FIG. 3 illustrates a communications network useable with one or more embodiments of the present invention. The communications network 300 of the illustrated embodiment includes a plurality of network elements or "nodes" including an NTP time server 302, an NTP time client 304, and a time server 306 communicatively coupled together via a communications medium 308 (e.g., an Ethernet, token ring, Fiber Distributed Data Interface, etc.). In various embodiments of the present invention NTP time server 302, NTP time client 304 and time server 306 may be implemented within any of a wide variety of data processing systems (e.g., hosts, routers, workstations, personal computers, etc.). In the illustrated embodiment, time server 306 may receive time data from NTP time server 302 and provide time data to NTP time client 304 in performing process embodiments illustrated by and described with respect to FIGS. 6 and 7. In one embodiment time server 306 is a multiprotocol or "dual-stack" node, capable of operating utilizing multiple network-layer protocols, (e.g., IPv4 and IPv6). In another embodiment of the present invention, time server 306 comprises an NTP time server.

Figure 4A:
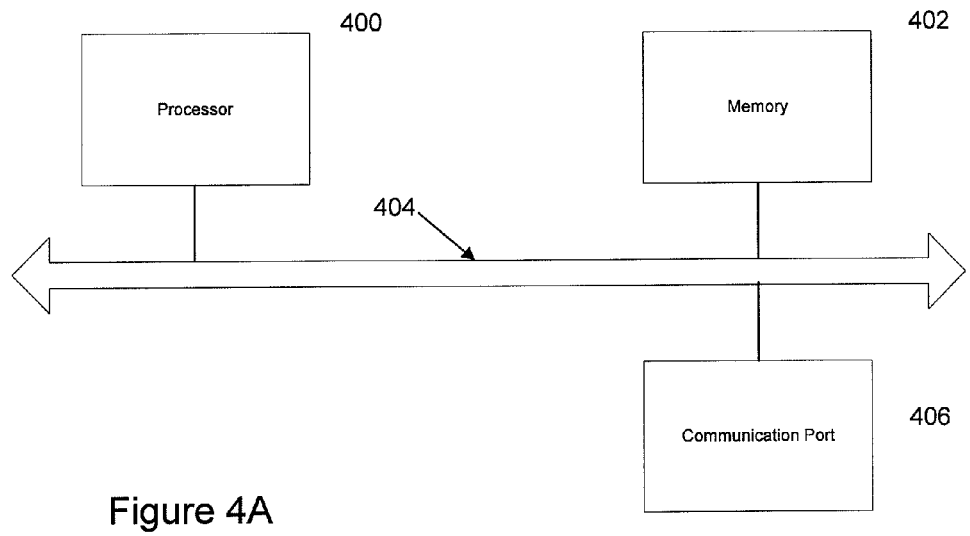
FIG. 4A illustrates a block diagram of an exemplary time client or time server network element data processing system according to an embodiment of the present invention.

FIG. 4A is a block diagram of an exemplary time client or time server network element data processing system according to an embodiment of the present invention. The data processing system of the illustrated embodiment includes a processor 400 and a memory 402 communicatively coupled together via a bus 404 or other communication interconnect and may further include a communications port 406 (e.g., a modem, network interface, etc.) as shown. According to one embodiment of the present invention, memory 402 serves as a machine-readable medium as described herein, providing data and instructions to and receiving processed data from processor 400 via bus 404. Data processing systems according to alternative embodiments of the present invention may include additional elements and/or features such as various input/output devices (e.g., keyboards, cursor control devices, displays, printers, scanners, etc.), additional processors, memories, buses, and the like.

Figure 4B:
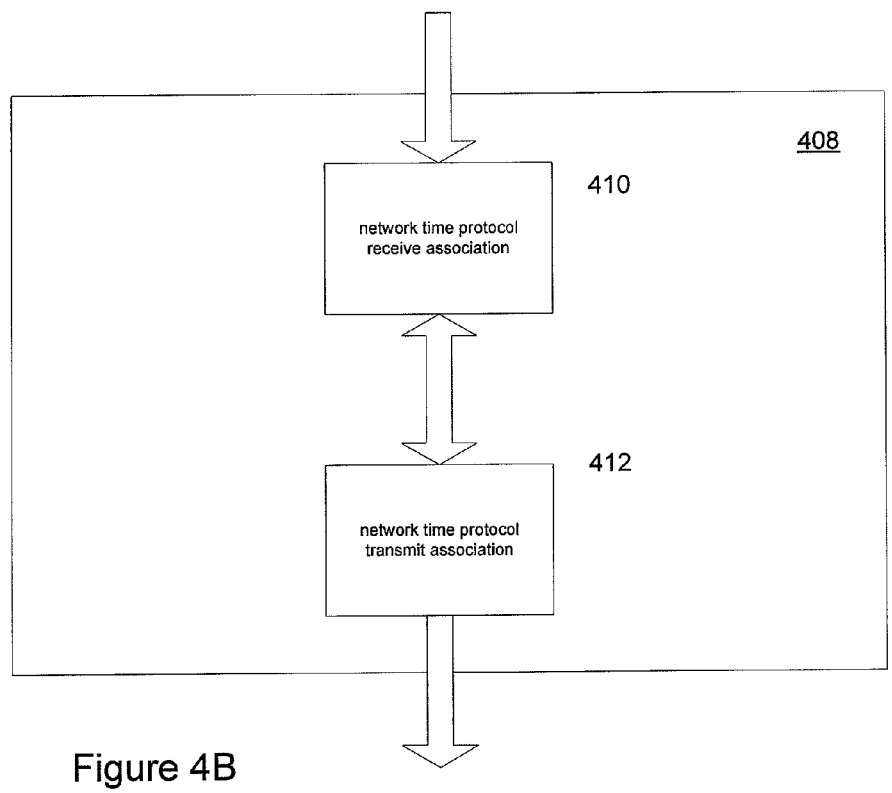
FIG. 4B illustrates a conceptual block diagram of a memory space of a time server network element data processing system according to one embodiment of the present invention.

FIG. 4B illustrates a conceptual block diagram of a memory space of a time server network element data processing system according to one embodiment of the present invention. The memory space 408 of the illustrated embodiment includes a network time protocol receive association 410 to receive time data (e.g., from an NTP time server) coupled with a network time protocol transmit association 412 to transmit time data (e.g., to an NTP time client). Within the described embodiments of the present invention, an association is an instantiation of the network time protocol machine which is typically paired with an association on another network element or node and utilized to provide communication therebetween.

Figure 5:
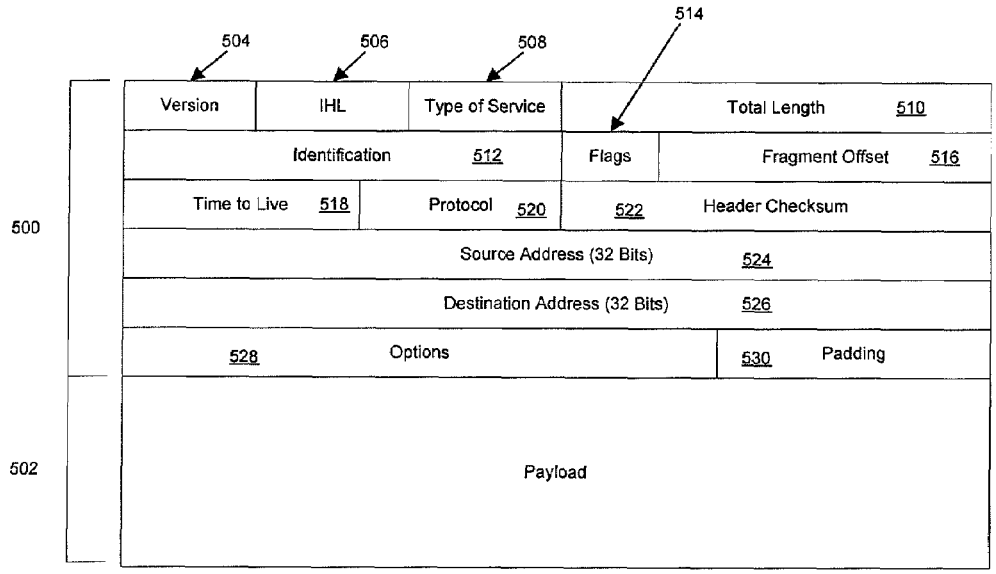
FIG. 5 illustrates an IPv4 packet useable with one or more embodiments of the present invention.

FIG. 5 illustrates an IPv4 packet useable with one or more embodiments of the present invention. The packet of the illustrated embodiment includes a packet header 500 including data utilized in transferring the packet from a source to a destination node or otherwise administering the packet and a packet payload 502 including the data to be transferred. The packet header 500 of the illustrated embodiment includes a version field 504, an internet header length field 506, a type of service field 508, a total length field 510, an identification field 512, a control flags field 514, a fragment offset field 516, a time to live field 518, a protocol field 520, a header checksum field 522, a source address 524, a destination address 526, an options field 528, and a padding field 530 arranged as shown.

As described in the IPv4 specification, version field 504 includes a 4-bit value specifying the Internet Protocol version of the packet; internet header length field 506 includes a 4-bit value specifying the length of packet header 500 in 32-bit words, thus indicating the location of packet payload 502 and its associated data; type of service field 508 includes an 8-bit value providing an indication of abstract parameters of the quality of service desired which are used to guide the selection of actual service parameters when transmitting the packet through a communications network; total length field 510 includes a 16-bit value specifying the length of the packet in octets; identification field 512 includes a 16-bit value assigned by the packet's sender to aid in assembling fragments of a packet; control flags field 514 includes three 1-bit control flag values indicating whether or not the packet's data may be fragmented, and whether or not packet payload 502 includes the last fragment of a group; fragment offset field 516 includes a 13-bit value indicating, in units of octets, where within a data unit (e.g., a datagram) a fragment included within packet payload 502 belongs; time to live field 518 includes an 8-bit value indicating the maximum amount of time in seconds that the packet is allowed to remain within an internet communications network before being destroyed or discarded; protocol field 520 includes an 8-bit value indicating the next level protocol (e.g., ICMP, UDP, TCP, etc.) used in the packet payload 502 portion of the packet; header checksum field 522 includes a 16-bit checksum value for packet header 500 which is recomputed and verified at each point that packet header 500 is processed; source address 524 includes a 32-bit IP address of the originator of the packet; destination address 526 includes a 32-bit IP address of an intended recipient of the packet which may or may not be the ultimate recipient; options field 528 is optional and in one embodiment includes a variable number of bits specifying various options (e.g., debugging, security, routing, etc.) associated with the packet; and padding field 530, also optional, includes a variable number of bits used to ensure that packet header 500 ends on a 32-bit boundary.

Figure 6:
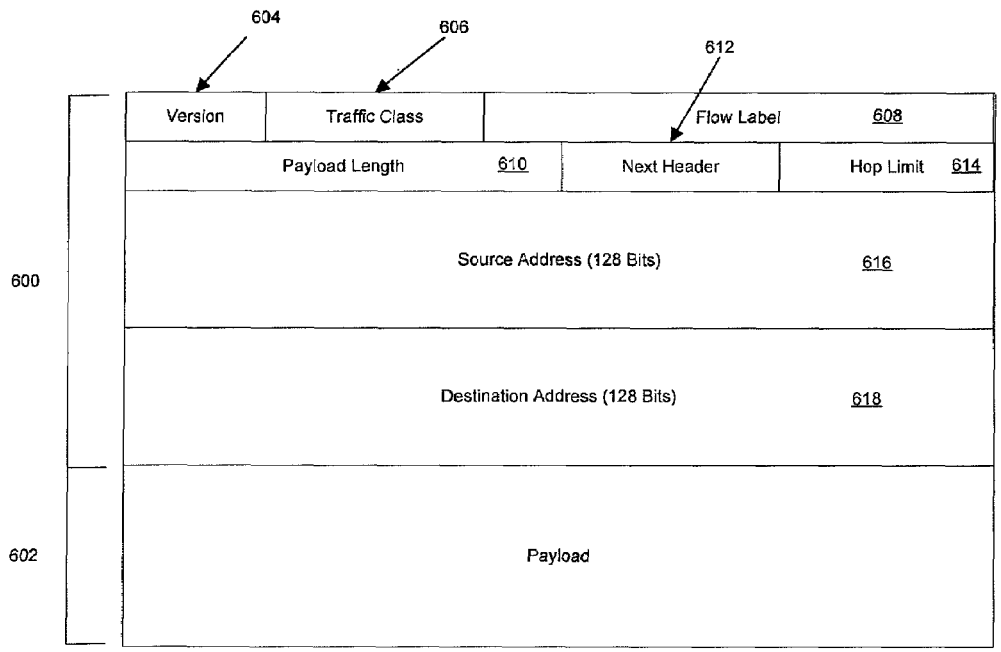
FIG. 6 illustrates an IPv6 packet useable with one or more embodiments of the present invention.

FIG. 6 illustrates an IPv6 packet useable with one or more embodiments of the present invention. The packet of the illustrated embodiment includes packet header 600 and packet payload 602 regions similar to those described with respect to FIG. 5 herein. In contrast to packet header 500 of FIG. 5 however, packet header 600 includes a version field 604, a traffic class field 606, a flow label field 608, a payload length field 610, a next header field 612, a hop limit field 614, a source address 616, and a destination address 618 arranged as shown.

As described in the IPv6 specification, version field 604 includes a 4-bit value specifying the Internet Protocol version of the packet; traffic class field 606 includes an 8-bit traffic class value which may be utilized by originating nodes and/or forwarding routers to identify and distinguish between different classes or priorities of packets; flow label field 608 includes a 20-bit flow label value which may be used by a source node to label sequences of packets for which it requests special handling by routers, such as non-default quality of service or "real-time" service; payload length field 610 includes a 16-bit unsigned integer specifying the length of packet payload 602 in octets; next header field 612 includes an 8-bit selector used to identify the type of header immediately following packet header 600; hop limit field 614 includes an 8-bit unsigned integer which is decremented by 1 by each node that forwards the packet and utilized as a signal to discard the packet if the hop limit value is decremented to zero; source address 616 includes a 128-bit IP address of the originator of the packet; and destination address 618 includes a 128-bit address of an intended recipient of the packet which may or not be the ultimate recipient.

Figure 7:
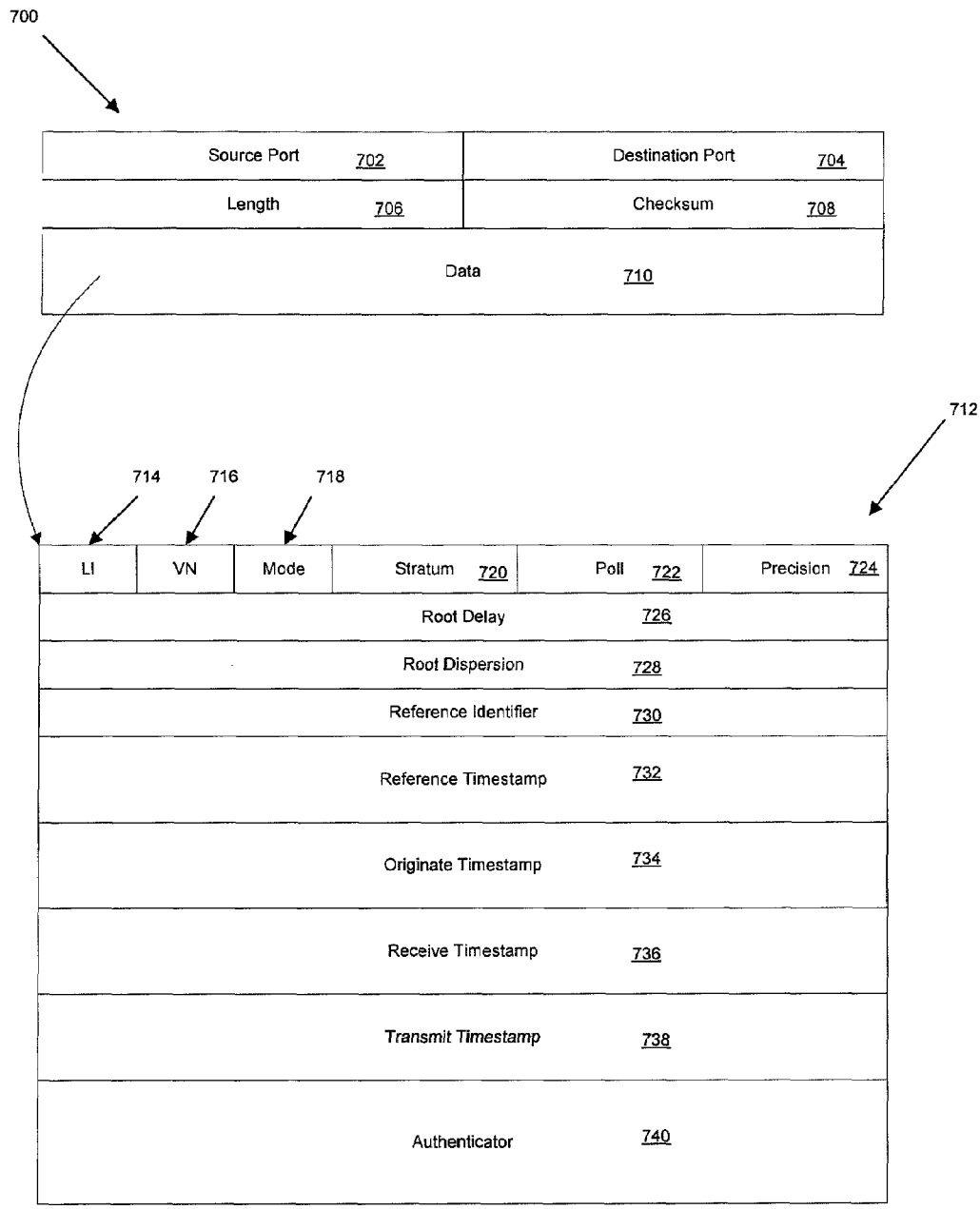
FIG. 7 illustrates a UDP datagram and associated NTP message useable with one or more embodiments of the present invention.

FIG. 7 illustrates a UDP datagram and associated NTP message useable with one or more embodiments of the present invention. In one embodiment of the present invention, UDP datagram 700 may be included within a packet payload of an IP packet such as that illustrated by and described with respect to the packets of FIGS. 5 and 6 herein. Having a similar header and payload structure as described with respect to the IP packets of FIGS. 5 and 6, UDP datagram 700 of the illustrated embodiment includes a source port field 702, a destination port field 704, a length field 706, a checksum field 708, and a data field 710 which in turn includes an NTP message 712 as illustrated. As described in the UDP specification, source port field 702 is an optional field which when utilized, indicates the port of the process or service which originated the UDP datagram; destination port field 704 has a meaning within the context of a particular internet destination address and similarly indicates the port or service which is the intended recipient of the UDP datagram; length field 706 specifies the total length in octets of the UDP datagram; checksum field 708 includes the 16-bit one's complement of the one's complement sum of a pseudo header of information from the UDP datagram's associated IP packet header, UDP header fields, and data field 710, padded with zero octets at the end (if necessary) to make a multiple of two octets.

NTP message 712 of the illustrated embodiment is stored within data field 710 of UDP datagram 700 and includes a leap indicator field 714, a version number field 716, a mode field 718, a stratum field 720, a poll interval field 722, a precision field 724, a root delay field 726, a root dispersion field 728, a reference identifier field 730, a reference timestamp field 732, an originate timestamp field 734, a receive timestamp 736, a transmit timestamp field 738, and an optional authenticator field 740 as shown.

As described in the NTP specification, leap indicator field 714 includes a 2-bit value utilized to warn nodes of the impending insertion or deletion of a leap second in the last minute of the current day; version number field 716 includes a 3-bit value indicating the NTP version number associated with NTP message 712; mode field 718 includes a 3-bit value indicating an operational mode associated with the node which generated NTP message 712 (e.g., symmetric active, symmetric passive, client, server, or broadcast); stratum field 720 includes an 8-bit value indicating the stratum level of the local clock of the node which generated NTP message 712; poll interval field 722 includes an 8-bit value indicating the maximum interval between successive NTP messages in seconds to the nearest power of two; precision field 724 includes an 8-bit value indicating the precision of the local clock in seconds to the nearest power of two; root delay field 726 includes a 32-bit value indicating total roundtrip delay to a primary reference source in seconds; root dispersion field 728 includes a 32-bit value indicating maximum error relative to the primary reference source in seconds; reference identifier field 730 includes a 32-bit value identifying the particular reference clock utilized; reference timestamp field 732 includes a 64-bit timestamp indicating the local time at which the local clock was last set or corrected; originate timestamp field 734 includes a 64-bit timestamp indicating the local time at which the request departed the client host for the service host; receive timestamp 736 includes a 64-bit timestamp indicating the local time at which the request arrived at the service host; transmit timestamp field 738 includes a 64-bit timestamp indicating the local time at which the reply departed the service host for the client host; and optional authenticator field 740 includes appropriate peer and packet variables utilized in the authentication, encryption, and decryption of NTP message data.

Figure 8:
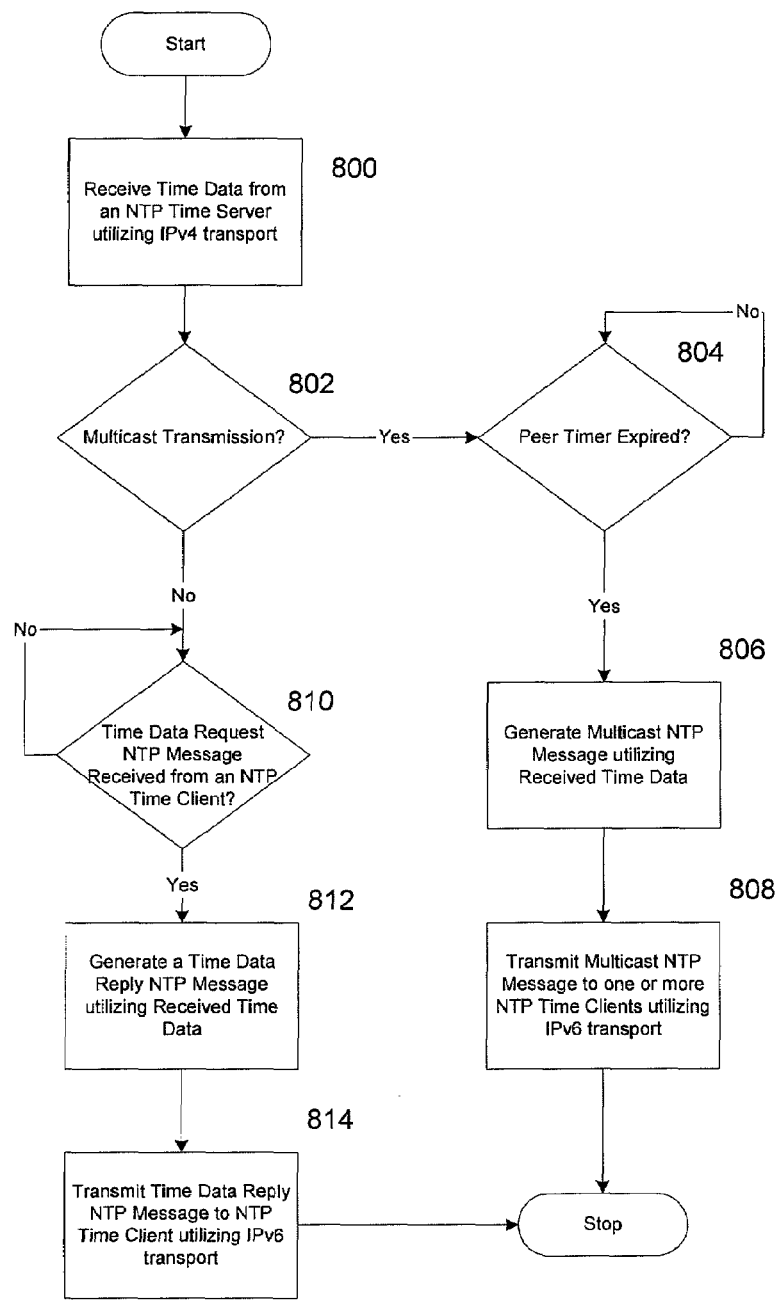
FIG. 8 illustrates an NTP time server synchronization process according to a first embodiment of the present invention.

FIG. 8 illustrates an NTP time server synchronization process according to a first embodiment of the present invention. In the illustrated process, time data is first received by an NTP time server either directly from a reference time source or from another NTP time server (e.g., via multicast, unicast, or anycast transmission of an NTP message) utilizing an IPv4 transport (process block 800). Thereafter, a determination is made whether or not the received time data is to be transmitted via multicast or "broadcast" transmission (process block 802). If multicast transmission is to be used, a determination is then made whether a peer timer has expired (process block 804) signaling the NTP time server that the next multicast time data transmission should be sent. Once a determination is made that the peer timer has expired, a multicast NTP message is generated utilizing the previously received time data (process block 806) and transmitted to one or more NTP time clients utilizing an IPv6 transport (process block 808).

If it is determined that the received time data is not to be transmitted by the NTP time server utilizing multicast transmission, a determination is made whether a time data request NTP message has been received (e.g., by unicast or anycast transmission) from an NTP time client (process block 810). Once a time data request has been received, a time data reply NTP message is generated utilizing the previously received time data (process block 812) and transmitted to the requesting NTP time client utilizing an IPv6 transport (process block 814) as shown.

Figure 9:
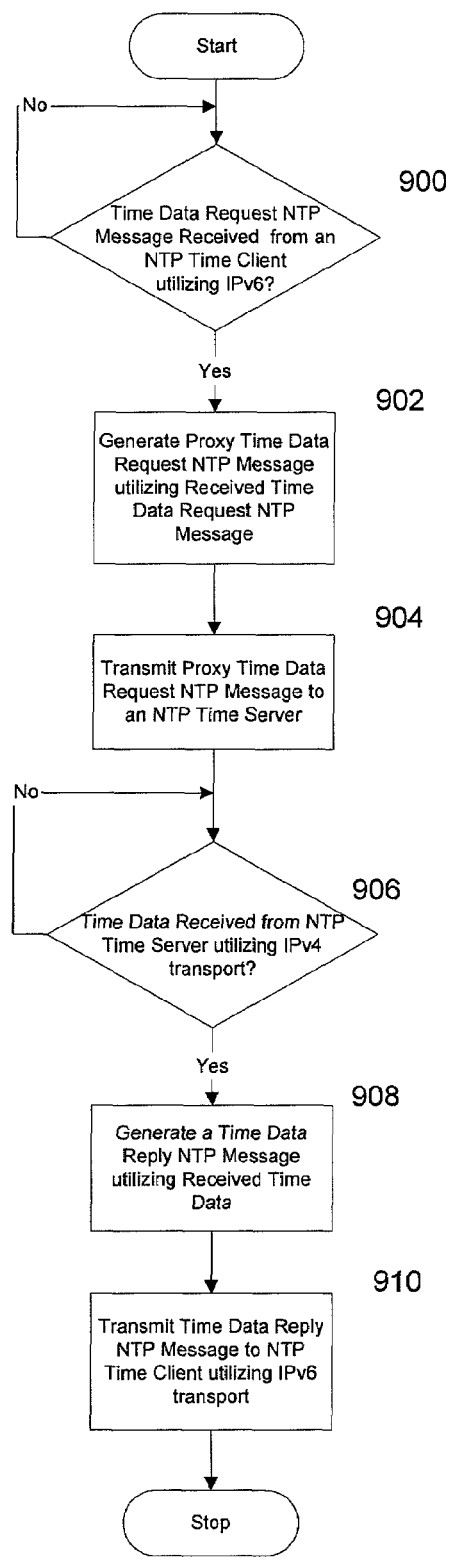
FIG. 9 illustrates an NTP time server synchronization process according to a second embodiment of the present invention.

FIG. 9 illustrates an NTP time server synchronization process according to a second embodiment of the present invention. In one such embodiment, a dual-stack time server is utilized as a silent, transparent NTP time server proxy. In the illustrated process, a determination is initially made whether or not a time data request NTP message has been received from an NTP time client utilizing IPv6 transport (process block 900). Once such a time data request NTP message has been received, a proxy time data request NTP message is generated utilizing the received time data request NTP message (process block 902) and transmitted to an NTP time server (process block 904). A determination is then made to identify when time data has been received from the polled NTP time server utilizing IPv4 transport (process block 906) as shown.

According to the illustrated embodiment, after time data has been received from an NTP time server in response to the described time data request NTP message, a time data reply NTP message is generated utilizing the received time data (process block 908) to respond to the original NTP time client-generated time data request NTP message. The generated time data reply NTP message is then transmitted to the described NTP time client utilizing IPv6 transport (process block 910).

In the foregoing description, the present invention has been described with reference to specific exemplary embodiments thereof. It should be understood however that various modifications and changes may be made thereto without departing from the broader spirit and scope of the present invention as set forth in the appended claims. The specification and drawings are accordingly to be regarded in an illustrative rather than restrictive sense.

What is claimed is:

1. A method comprising:
receiving from a first network time protocol time server time data representing a primary reference time source on said first network time protocol time server utilizing a first network-layer protocol, wherein said receiving is performed by a second server and further comprises
receiving a time data request network time protocol message from a network time protocol time client,
generating a proxy time data request network time protocol message in response to receiving said time data request network time protocol message from said network time protocol time client,
transmitting said proxy, time data request network time protocol message to said first network time protocol time server,
receiving a time data reply network time protocol message including said time data from said first network time protocol time server in response to transmitting said proxy time data request network time protocol message to said first network time protocol time server; and
transmitting said received time data representing said primary reference time source on said first network time protocol time server to said network time protocol time client utilizing a second network-layer protocol, wherein
said transmitting is performed by said second server, and
said first and second network-layer protocols are different network-layer protocols.

2. The method of claim 1, wherein,
transmitting said time data to said network time protocol time client utilizing said second network-layer protocol comprises,
receiving said time data request network time protocol message from said network time protocol time client;
transmitting said time data reply network time protocol message including said time data to said network time protocol time client in response to receiving said time data request network time protocol message from said network time protocol time client.

3. The method of claim 1, wherein,
transmitting said time data to said network time protocol time client utilizing said second network-layer protocol comprises,
transmitting a multicast network time protocol message including said time data to said network time protocol time client.

4. The method of claim 1, wherein,
receiving said time data from said network time protocol time server utilizing said first network-layer protocol comprises,
receiving a multicast network time protocol message including said time data from said first network time protocol time server.

5. The method of claim 4, wherein,
transmitting said time data to said network time protocol time client utilizing said second network-layer protocol comprises,
receiving a time data request network time protocol message from said network time protocol time client; and
transmitting a time data reply network time protocol message including said time data to said network time protocol time client in response to receiving said time data request network time protocol message from said network time protocol time client.

6. The method of claim 4, wherein,
transmitting said time data to said network time protocol time client utilizing said second network-layer protocol comprises,
transmitting a multicast network time protocol message including said time data to said network time protocol time client.

7. The method of claim 1, wherein,
receiving said time data from said first network time protocol time server utilizing said first network-layer protocol comprises,
receiving said time data utilizing internet protocol version 4; and
transmitting said time data to said network time protocol time client utilizing said second network-layer protocol comprises,
transmitting said time data utilizing internet protocol version 6.

8. The method of claim 1, wherein,
receiving said time data from said first network time protocol time server utilizing said first network-layer protocol comprises,
receiving said time data from an internet protocol version 4-only network time protocol time server; and
transmitting said time data to said network time protocol time client utilizing said second network-layer protocol comprises,
transmitting said time data to an internet protocol version 6-only network time protocol time client.

9. The method of claim 1, wherein,
receiving said time data from said first network time protocol time server utilizing said first network-layer protocol comprises,
receiving said time data from an internet protocol version 6-only network time protocol time server; and
transmitting said time data to said network time protocol time client utilizing said second network-layer protocol comprises,
transmitting said time data to an internet protocol version 4-only network time protocol time client.

10. The method of claim 1, wherein,
receiving said time data from said first network time protocol time server utilizing said first network-layer protocol comprises,
receiving a first packet including said time data from said first network time protocol time server utilizing said first network-layer protocol.

11. The method of claim 10, further comprising,
generating a second packet including said time data, wherein,
transmitting said time data to said network time protocol time client utilizing said second network-layer protocol comprises,
transmitting said second packet to said network time protocol time client utilizing said second network-layer protocol.

12. The method of claim 11, wherein,
receiving said first packet including said time data from said first network time protocol time server utilizing said first network-layer protocol comprises,
receiving an internet protocol version 4 packet; and
transmitting said second packet to said network time protocol time client utilizing said second network-layer protocol comprises,
transmitting an internet protocol version 6 packet.

13. The method of claim 1, further comprising:
adjusting a local clock associated with said network time protocol time client utilizing said received time data in response to transmitting said time data to said network time protocol time client utilizing said second network-layer protocol.

14. The method of claim 10, wherein,
said adjusting comprises,
synchronizing said local clock with said primary reference time source.

15. A machine-readable storage medium having a plurality of instructions executable by a processor embodied therein, wherein said plurality of instructions when executed cause said processor to perform a method comprising:
receiving from a first network time protocol time server time data representing a primary reference time source on said first network time protocol time server utilizing a first network-layer protocol, wherein said receiving is performed by a second server comprising said processor and said method further comprises receiving a time data request network time protocol message from a network time protocol time client,
generating a proxy time data request network time protocol message in response to receiving said time data request network time protocol message from said network time protocol time client,
transmitting said proxy time data request network time protocol message to said first network time protocol time server, and
receiving a time data reply network time protocol message including said time data from said first network time protocol time server in response to transmitting said proxy time data request network time protocol message to said first network time protocol time server; and
transmitting said received time data representing said primary reference time source on said first network time protocol time server to a network time protocol time client utilizing a second network-layer protocol, wherein said transmitting is performed by the second server, and
said first and second network-layer protocols are different network-layer protocols.

16. The machine-readable storage medium of claim 15, wherein,
transmitting said time data to said network time protocol time client utilizing said second network-layer protocol comprises,
receiving said time data request network time protocol message from said network time protocol time client;
transmitting said time data reply network time protocol message including said time data to said network time protocol time client in response to receiving said time data request network time protocol message from said network time protocol time client.

17. The machine-readable storage medium of claim 15, wherein,
 transmitting said time data to said network time protocol time client utilizing said second network-layer protocol comprises,
  transmitting a multicast network time protocol message including said time data to said network time protocol time client.

18. The machine-readable storage medium of claim 15, wherein,
 receiving said time data from said network time protocol time server utilizing said first network-layer protocol comprises,
  receiving a multicast network time protocol message including said time data from said first network time protocol time server.

19. The machine-readable storage medium of claim 18, wherein,
 transmitting said time data to said network time protocol time client utilizing said second network-layer protocol comprises,
  receiving a time data request network time protocol message from said network time protocol time client; and
  transmitting a time data reply network time protocol message including said time data to said network time protocol time client in response to receiving said time data request network time protocol message from said network time protocol time client.

20. The machine-readable storage medium of claim 18, wherein,
 transmitting said time data to said network time protocol time client utilizing said second network-layer protocol comprises,
  transmitting a multicast network time protocol message including said time data to said network time protocol time client.

21. The machine-readable storage medium of claim 15, wherein,
 receiving said time data from said first network time protocol time server utilizing said first network-layer protocol comprises,
  receiving said time data utilizing internet protocol version 4; and
 transmitting said time data to said network time protocol time client utilizing a second network-layer protocol comprises,
  transmitting said time data utilizing internet protocol version 6.

22. The machine-readable storage medium of claim 15, wherein,
 receiving said time data from said first network time protocol time server utilizing said first network-layer protocol comprises,
  receiving said time data from an internet protocol version 4-only network time protocol time server; and
 transmitting said time data to said network time protocol time client utilizing said second network-layer protocol comprises,
  transmitting said time data to an internet protocol version 6-only network time protocol time client.

23. The machine-readable storage medium of claim 15, wherein,
 receiving said time data from said first network time protocol time server utilizing said first network-layer protocol comprises,
  receiving said time data from an internet protocol version 6-only network time protocol time server; and
 transmitting said time data to said network time protocol time client utilizing said second network-layer protocol comprises,
  transmitting said time data to an internet protocol version 4-only network time protocol time client.

24. The machine-readable storage medium of claim 15, wherein,
 receiving said time data from said first network time protocol time server utilizing said first network-layer protocol comprises,
  receiving a first packet including said time data from said network time protocol time server utilizing said first network-layer protocol.

25. The machine-readable storage medium of claim 24, wherein,
 said method further comprises,
  generating a second packet including said time data, wherein,
   transmitting said time data to said network time protocol time client utilizing said second network-layer protocol comprises,
    transmitting said second packet to said network time protocol time client utilizing said second network-layer protocol.

26. The machine-readable storage medium of claim 25, wherein,
 receiving said first packet including said time data from said first network time protocol time server utilizing said first network-layer protocol comprises,
  receiving an internet protocol version 4 packet; and
 transmitting said second packet to said network time protocol time client utilizing said second network-layer protocol comprises,
  transmitting an internet protocol version 6 packet.

27. The machine-readable storage medium of claim 15, wherein,
 said method further comprises,
  adjusting a local clock associated with said network time protocol time client utilizing said received time data in response to transmitting said time data to said network time protocol time client utilizing said second network-layer protocol.

28. The machine-readable storage medium of claim 27, wherein,
 said adjusting comprises,
  synchronizing said local clock with a said primary reference time source.

29. An apparatus comprising:
 means for receiving from a first network time protocol time server time data
 representing a primary reference time source on said first network time protocol time server utilizing a first network-layer protocol, wherein a second server comprises said means for receiving, and said means for receiving further comprises
 means for receiving a time data request network time protocol message from said network time protocol time client,
 means for generating a proxy, time data request network time protocol message in response to a receipt of said time data request network time protocol message from a network time protocol time client,
 means for transmitting said proxy time data request network time protocol message to said first network time protocol time server,
 means for receiving a time data reply network time protocol message including said time data from said first network time protocol time server in response to a transmission of said proxy time data request network time protocol message to said first network time protocol time server; and means for transmitting said received time data representing said primary reference time source on said first network time protocol time server to said network time protocol time client utilizing a second network-layer protocol, wherein said second server further comprises said means for transmitting, and said first and second network-layer protocols are different network-layer protocols.

30. The apparatus of claim 29, wherein, said means for transmitting said time data to said network time protocol time client utilizing said second network-layer protocol comprises, means for receiving said time data request network time protocol message from said network time protocol time client;

means for transmitting said time data reply network time protocol message including said time data to said network time protocol time client in response to a receipt of said time data request network time protocol message from said network time protocol time client.

31. The apparatus of claim 29, wherein, said means for transmitting said time data to said network time protocol time client utilizing said second network-layer protocol comprises, means for transmitting a multicast network time protocol message including said time data to said network time protocol time client.

32. The apparatus of claim 29, wherein, said means for receiving said time data from said network time protocol time server utilizing said first network-layer protocol comprises, means for receiving a multicast network time protocol message including said time data from said first network time protocol time server.

33. The apparatus of claim 32, wherein, said means for transmitting said time data to said network time protocol time client utilizing said second network-layer protocol comprises, means for receiving a time data request network time protocol message from said network time protocol time client; and means for transmitting a time data reply network time protocol message including said time data to said network time protocol time client in response to a receipt of said time data request network time protocol message from said network time protocol time client.

34. The apparatus of claim 32, wherein, said means for transmitting said time data to said network time protocol time client utilizing said second network-layer protocol comprises, means for transmitting a multicast network time protocol message including said time data to said network time protocol time client.

35. The apparatus of claim 29, wherein, said means for receiving said time data from said first network time protocol time server utilizing said first network-layer protocol comprises, means for receiving said time data utilizing internet protocol version 4; and said means for transmitting said time data to said network time protocol time client utilizing said second network-layer protocol comprises, means for transmitting said time data utilizing internet protocol version 6.

36. The apparatus of claim 29, wherein, said means for receiving said time data from said first network time protocol time server utilizing said first network-layer protocol comprises, means for receiving said time data from an internet protocol version 4-only network time protocol time server; and said means for transmitting said time data to said network time protocol time client utilizing said second network-layer protocol comprises, means for transmitting said time data to an internet protocol version 6-only network time protocol time client.

37. The apparatus of claim 29, wherein, said means for receiving said time data from said first network time protocol time server utilizing said first network-layer protocol comprises, means for receiving said time data from an internet protocol version 6-only network time protocol time server; and said means for transmitting said time data to said network time protocol time client utilizing said second network-layer protocol comprises, means for transmitting said time data to an internet protocol version 4-only network time protocol time client.

38. The apparatus of claim 29, wherein, said means for receiving said time data from said first network time protocol time server utilizing said first network-layer protocol comprises, means for receiving a first packet including said time data from said first network time protocol time server utilizing said first network-layer protocol.

39. The apparatus of claim 38, further comprising, means for generating a second packet including said time data, wherein, said means for transmitting said time data to said network time protocol time client utilizing said second network-layer protocol comprises, means for transmitting said second packet to said network time protocol time client utilizing said second network-layer protocol.

40. The apparatus of claim 39, wherein, said means for receiving said first packet including said time data from said first network time protocol time server utilizing said first network-layer protocol comprises, means for receiving an internet protocol version 4 packet; and said means for transmitting said second packet to said network time protocol time client utilizing said second network-layer protocol comprises, means for transmitting an internet protocol version 6 packet.

41. The apparatus of claim 29, further comprising:

means for adjusting a local clock associated with said network time protocol time client utilizing said received time data in response to a transmission of said time data to said network time protocol time client utilizing said second network-layer protocol.

42. The apparatus of claim 41, wherein,
said means for adjusting comprises,
- means for synchronizing said local clock with a said primary reference time source.

43. A time server comprising:
a memory comprising:
- a first network time protocol association to receive from a network time protocol time server time data representing a primary reference time source on said network time protocol time server utilizing a first network-layer protocol, wherein said first network time protocol association is further configured to
  - receive a time data request network time protocol message from said network time protocol time client,
  - generate a proxy time data request network time protocol message in response to a receipt of said time data request network time protocol message from said network time protocol time client, transmit said proxy time data request network time protocol message to said network time protocol time server, and
  - receive a time data reply network time protocol message including said time data from said network time protocol time server in response to a transmission of said proxy time data request network time protocol message to said network time protocol time server; and
- a second network time protocol association, coupled with said first network time protocol association, to transmit said received time data representing said primary reference time source on said network time protocol time server to said network time protocol time client utilizing a second network-layer protocol, wherein
  - said first and second network-layer protocols are different protocols.

* * * * *